United States Patent [19]

Smit

[11] Patent Number: 4,912,915

[45] Date of Patent: Apr. 3, 1990

[54] ROTARY CUTTER IMPLEMENTS

[75] Inventor: Edward H. Smit, Sheffield, Iowa

[73] Assignee: Sukup Manufacturing Company, Sheffield, Iowa

[21] Appl. No.: 371,415

[22] Filed: Jun. 26, 1989

Related U.S. Application Data

[63] Continuation-in-part of Ser. No. 278,103, Nov. 30, 1988, abandoned.

[51] Int. Cl.⁴ .................... A01D 34/66; A01D 34/74; A01D 34/86
[52] U.S. Cl. .......................................... 56/6; 56/13.6
[58] Field of Search .................. 56/6, 13.6, 52, 53, 56/102, 503, 255, 295, 17.2, DIG. 10, 14.7, 14.9

[56] References Cited

U.S. PATENT DOCUMENTS

| | | | |
|---|---|---|---|
| 2,982,080 | 5/1961 | Martin | 56/6 |
| 3,063,226 | 11/1962 | Pfauser | 56/6 X |
| 3,068,630 | 12/1962 | Caldwell | 56/6 |
| 3,115,738 | 12/1963 | Engler | 56/6 |
| 3,473,302 | 10/1969 | Caldwell | 56/6 |
| 3,500,619 | 3/1970 | Bacon | 56/6 |
| 3,543,490 | 12/1970 | Erickson | 56/6 X |
| 3,564,822 | 2/1971 | Engler | 56/6 X |
| 3,832,834 | 9/1974 | Kovacs | 56/6 |
| 4,135,349 | 1/1979 | Schwertner | 56/6 |
| 4,815,259 | 3/1989 | Scott | 56/6 |

OTHER PUBLICATIONS

Side-Winder PG 210 Rotary Cutter Advertisement.
Side-Winder FW-215 and FW-315 Rotary Cutter Advertisement.
Side-Winder GB-10 Rotary Cutter Advertisement.
Caroni Finishing Mower Advertisement.
Photographs of a Douglas Mower.
Advertisement for a mid-size Walker Mower Published in Illinois Agri News, Friday, Mar. 24, 1989.

Primary Examiner—Stephen J. Novosad
Attorney, Agent, or Firm—Neuman, Williams, Anderson & Olson

[57] ABSTRACT

A rotary cutter or mower implement for cutting crop materials. The rotary cutter has a housing with support skids on each side of the housing. Presser wheels are positioned in front of the support skids. The support skids and presser wheels are vertically adjustable relative to the rotary cutter housing.

14 Claims, 2 Drawing Sheets

4,912,915

ROTARY CUTTER IMPLEMENTS

This application is a continuation-in-part of a copending application Ser. No. 278,103, filed on Nov. 30, 1988, abandoned.

This invention relates to rotary cutter or mower implements and more particularly to rotary cutters which will substantially follow the contour of the terrain. As used herein the terms cutter and cutting refer to implements and processes for mowing a standing crop as well as chopping or shredding stover, such as corn stalks, or a combination of both.

BACKGROUND OF THE INVENTION

Some rotary cutters are designed to be towed or otherwise moved by a motor driven vehicle e.g., a tractor. Other rotary cutters are designed to be mounted to the vehicle. Narrower cutters may have a single wide cutter section, but wide versions are articulated in that they have a main, or central, section to which one or more side or wing sections (typically two) are pivotally attached. Usually such sections have ground engaging support wheels which follow the contour of the ground during normal mowing operations. In the articulated versions, the sections pivot with respect to each other a limited amount as the wheels follow the contour of the ground. Typically such wing sections can be raised and held in a raised position for storage or transport.

The height of the cut from the terrain can be changed by appropriate adjustment means, such as adjusting the height setting of the ground engaging wheels. For example, the adjustment of support wheels on towed cutters can be performed manually or by means of an elevating mechanism which is driven by the fluid pressure supply of the motor driven vehicle. In mounted cutters, the height may be adjusted directly through the mounting mechanism.

Some rotary cutters use a skid member which is secured to the lower edge of a side wall to serve as a wear plate in the event that the side wall should come in contact with the ground.

SUMMARY OF THE INVENTION

This invention was evolved with the general object of improving upon prior rotary cutters and is particularly beneficial in those which include folding wing sections.

An important feature of the invention is that a presser wheel is mounted on the front outside corner of each cutter implement ahead of a support skid on the respective side of the implement. The presser wheel can be adjusted consistent with the height of the cut. The combination of the adjustable skids and the front presser wheels avoids or limits the unintentional lowering of the respective mower section when the presser wheel encounters a hole or other depression.

Another feature is that the presser wheels on the front corner of each implement act as rolling presses to prevent trash from accumulating at the front of the skids, which also may be adjustable.

This invention contemplates other objects, features and advantages which will become more fully apparent from the following detailed description taken in conjunction with the accompanying drawings.

DESCRIPTION OF PREFERRED EMBODIMENT

Figure 1:
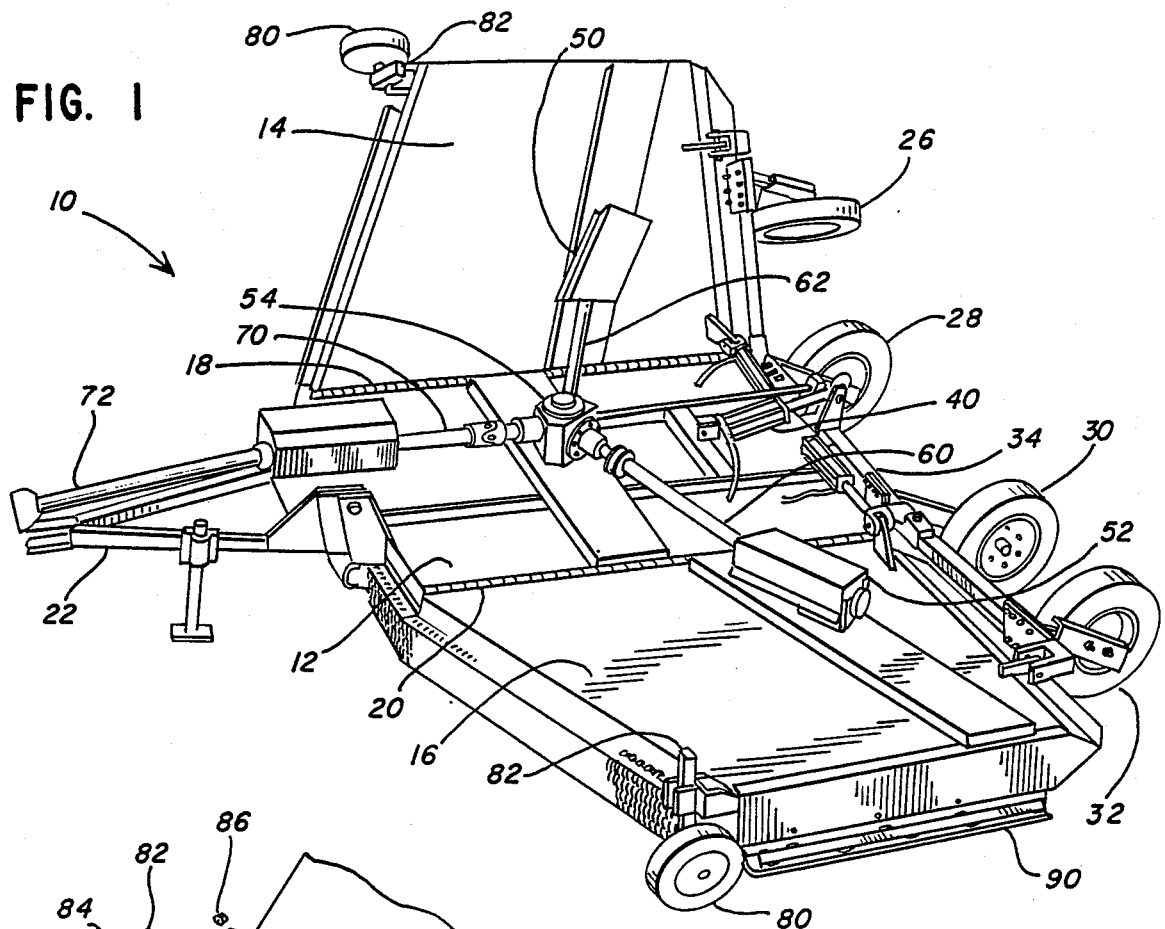
FIG. 1 is a perspective view of a folding-wing rotary cutter employing teachings of this invention.
Figure 2:
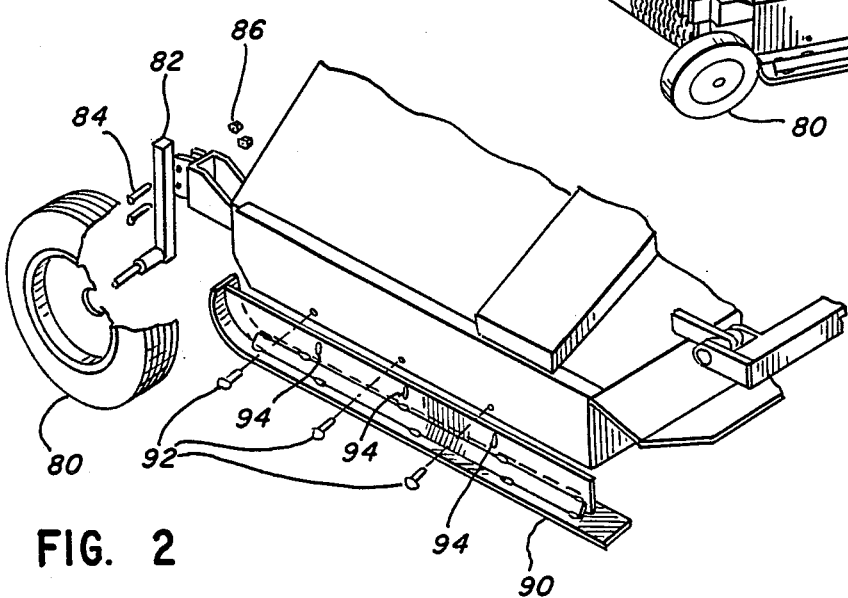
FIG. 2 is an exploded view of the front presser wheel assembly and the outside skid of the cutter of FIG. 1.
Figure 3:
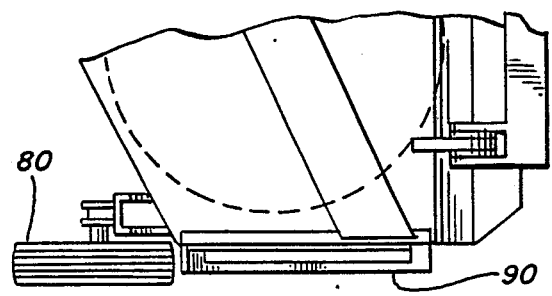
FIG. 3 is a partial plan view of the folding wing rotary cutter of FIG. 1.

Reference numeral 10 generally designates a folding-wing rotary cutter constructed in accordance with the principles of the invention. The cutter preferably includes a center section 12 and wing, or side, sections 14 and 16 connected to the center section by suitable hinges 18 and 20 with the hinge axes extending longitudinally of the direction of travel of the cutter. The hinges permit relative pivotal movement between the connected sections, e.g., of 70° above horizontal on upward movements and 12° below horizontal on downward movements, so that the cutter can flexibly transverse over uneven terrain and still generally follow the contour of the terrain.

The center section 12 has a hitch 22 which provides connection to a tractor or other motor driven vehicle (not shown) to tow or draw the cutter. The forward end of the cutter 10 is supported by the hitch 22.

The rear of the cutter 10 is supported by ground-engaging wheels 26, 28, 30 and 32. The rear ground-engaging wheels 26, 28, 30 and 32 are connected to the center section 12 and the wing sections 14 and 16 by wheel mounting assemblies 34. The mounting assemblies 34 are designed so that the height of the center section 12 and wing sections 14 and 16 can be adjusted by a hydraulic cylinder 40. The hydraulic cylinder 40 is driven by the fluid pressure supply of the towing vehicle. The hydraulic cylinder 40 may be controlled from the vehicle with conventional hydraulic valves.

The center section 12 and wing sections 14 and 16 contain rotary horizontal blade cutter assemblies (not shown), which may be of conventional design. These cutter assemblies are driven by gear boxes 50, 52 and 54. Gear boxes 50 and 52 are mounted on the upper surface of the wing sections 14 and 16 respectively. Gear boxes 50 and 52 are driven by drive shafts and universal joint assemblies 60 and 62 which are connected to gear box 54.

Gearbox 54 is a "Y" gearbox which is mounted on the upper surface of the center section 12. A drive shaft and universal joint assembly 70 drives gear box 54. The drive shaft and universal joint assembly 70 is connected to drive shaft and universal joint assembly 72. Drive shafts and universal joint assemblies 70 and 72 are supported by center section 12. The drive shaft and universal joint assembly 72 is driven by the rotative power take-off of the towing vehicle.

The wing sections 14 and 16 of the cutter are also supported by presser or gauge wheels 80. The wheels 80 are mounted on the front outside corner of wing sections 14 and 16. These wheels 80 are connected to wheel mounting supports 82. The wheel mounting supports 82 are held in frictional engagement with the wing sections 14 and 16 by bolts 84 and nuts 86. The wheel mounting supports 82 can be adjusted to accommodate an increase or decrease in the ground clearance or "height" setting of the wing sections 14 and 16. In order to adjust the height of the wheel mounting supports 82, the bolts 84 and nuts 86 are loosened and the wheel mounting supports 82 are positioned to the desired height setting. The bolts 84 and nuts 86 are then tightened to maintain the wheel mounting support 82 in the desired position.

Figure 4:
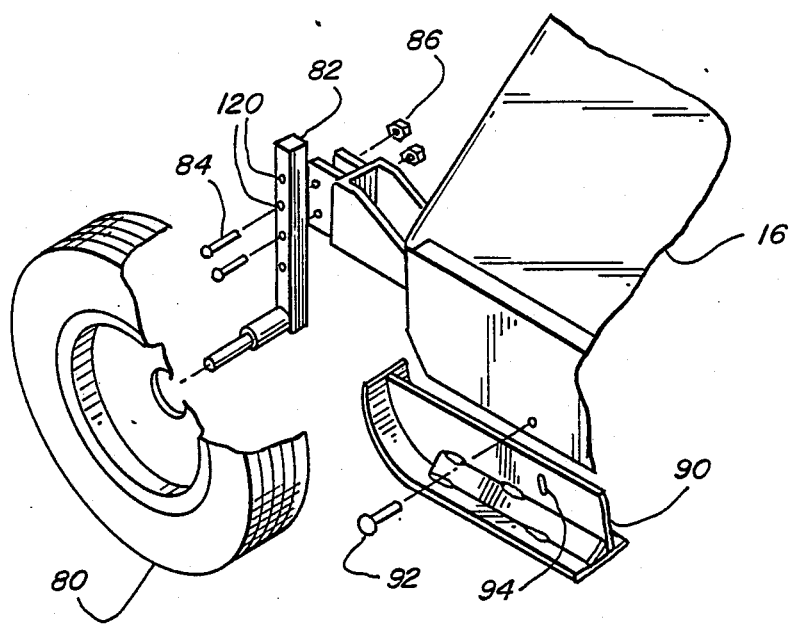
FIG. 4 is an exploded view of a second embodiment of the front presser wheel assembly.

As shown in FIG. 4, the wheel mounting supports 82 can also have a series of holes 120. The bolts 84 are inserted into the mounting supports 82 through holes 120 and into the wing sections 14 and 16. The bolts 84 are fastened with nuts 86. In order to adjust the height of the wheel mounting supports 82, the bolts 84 are removed from the mounting supports 82 and wing sections 14 and 16. The mounting supports 82 are positioned to the desired height setting. The bolts 84 are inserted into mounting supports 82 through holes 120 and wing sections 14 and 16. The bolts 84 are fastened with nuts 86 to maintain the wheel mounting supports 82 in the desired position. The holes 120 in mounting supports 82 provide a positive engagement for attachment of the mounting supports 82 to the wing sections 14 and 16.

The presser wheels 80 are positioned forward of and in substantial alignment with skids 90 provided on the sides of the wing sections 14 and 16. The skids 90 are secured to the side walls of the wing sections 14 and 16 by bolts 92. The skids 90 extend below the lowermost cutting plane of the rotary cutters and can be adjusted to increase or decrease the height setting of the skids 90 with respect to the wing sections 14 and 16. The skids 90 have three vertical slots 94 which receive the bolts 92. The bolts 92 are loosened and the skids 90 are positioned to the desired height. The bolts 92 are then tightened to maintain the skids 90 in the desired position. The skids 90 thus may extend various distances below the level of the cutter blade assemblies 50, 52 and 54.

Figure 5:
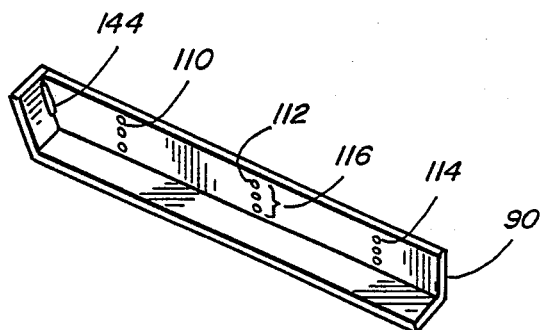
FIG. 5 is a perspective view of a second embodiment of the skid member.

As shown in FIG. 5, the three vertical slots 94 can be replaced by three rows 110, 112, 114 of holes 116 which are in substantially vertical alignment. The skids 90 can be adjusted to increase or decrease the height setting of the skids 90 with respect to the wing sections 14 and 16. The bolts 92 are removed from the skids 90 and the skids 90 are positioned to the desired height. The bolts 92 are then inserted into the holes 116 and tightened to maintain the skids 90 in the desired position.

The skids 90 normally are slightly above the ground when the cutter is supported by the wheels on a level surface. The skids avoid or limit the undue unintentional lowering of the wing sections 14 and 16 when the towing/support vehicle or the respective support wheel, 26 or 32, and/or the respective presser wheel 80 encounters a hole or other depression in the terrain or when the cutter traverses a short, sharp rise or ridge. This reduces the risk of engagement of the ground or scalping by the rotary cutter blades. At the same time, the presser wheels 80 act as rolling presses to prevent trash from accumulating at the front of the skids 90 and also gouging engagement of the leading end into the ground whenever a sharp rise is encountered.

Figure 6:
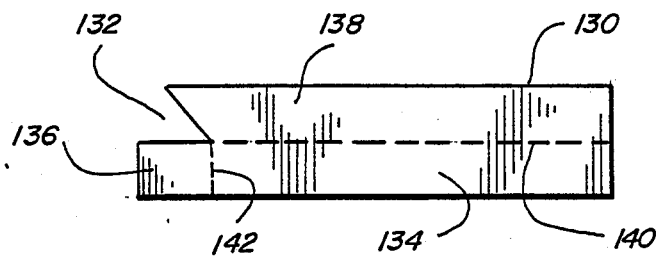
FIG. 6 is a plan view of the skid member prior to bending.

As shown in FIG. 5, the skids 90 can be manufactured from one piece of flat material, preferably metal stock. The flat stock 130 is notched at 132 to remove excess material as shown in FIG. 6. The angle of the notch at 132 will be the complementary angle which is formed by the horizontal portion of the skid 134 and the front portion of the skid 136 when the skid is completely formed. The flat stock 130 is then bent along line 140 to form a 90 degree angle between horizontal portion 134 and vertical portion 138. The partially formed skid is then bent along line 142 to form the appropriate angle between the horizontal portion 134 and the front portion 136. In this particular embodiment, the angle between the horizontal portion 134 and the front portion 136 is approximately 45 degrees. After the bending is completed, the skid 90 is welded along the intersection 144 of the vertical portion 138 and the front portion 136.

Although the illustrated embodiment is a rotary cutter which is towed or drawn by a vehicle, the features of this invention can also be used on rotary cutters which are mounted to a vehicle. The related presser wheel and skid features also may be employed on cutters which have a single rigid wide body or housing, though they are particularly advantageous in articulated cutters such as the cutter illustrated in the accompanying drawings and described in some detail above. Further, it will be appreciated that the forward support-presser wheels 80 may be offset from the extended centerlines of the skids and/or may be caster mounted, so long as their normal track overlaps or is closely adjacent the forward profile of the respective skid.

It will be understood that further modifications and variations may be effected without departing from the spirit and scope of the novel concepts of this invention.

What is claimed is:

1. A rotary cutter implement for cutting crop materials as said implement traverses the ground, said implement including a housing and a support skid at each lateral side thereof, each of said skids being oriented parallel to the direction of normal travel of said implement, rotary cutter elements for cutting crop materials beneath said housing, each of said skids having a lower support surface disposed below the plane of the normal cutting action of said cutter elements, and a wheel disposed at the forward end of each of said skids and extending downward below the plane of the lower surface of the respective skid for supporting said section, each of said wheels being positioned relative to the respective skid such that the normal track of said wheel overlaps or is closely adjacent the forward profile of said respective skid whereby said wheel limits trash build-up ahead of said skid.

2. The invention as in claim 1 wherein said housing includes a means for vertically adjusting said wheels relative to said housing for the adjustment of the normal height of cutting by said cutter implement above the ground.

3. The invention as in claim 1 wherein said housing includes a side wall at each of said lateral sides, each of said skids being mounted on the respective side wall.

4. The invention as in claim 3 wherein each of said side walls includes a means for adjustably attaching said respective skid.

5. A rotary cutter implement for cutting crop materials as said implement traverses the ground, said implement including a first section, at least one side section, each of said sections including rotary cutter elements for cutting crop materials beneath the respective section, means interconnecting each said side section to said first section for permitting vertical movement of each said side section relative to said first section, and support means mounted on each said side section in a position remote from said interconnecting means, said support means including a support skid element oriented in the direction of normal travel of said implement and a presser wheel disposed at the forward end of said skid element for supporting the respective side section, each of said wheels being positioned relative to the respective skid such that the normal track of said wheel overlaps or is closely adjacent the forward profile of said respective skid whereby said wheel limits trash build-up ahead of said skid element.

6. The invention as defined in claim 5 wherein each of said sections includes a means for vertically adjusting said wheels relative to said sections for the adjustment of the normal height of cutting by said cutter implement above the ground.

7. The invention as defined in claim 5 wherein said wheels are forward of and in alignment with said skid elements.

8. The invention as defined in claim 5 wherein each said side section includes a side wall, each of said skid elements being mounted on the respective side wall.

9. The invention as defined in claim 8 wherein each of said side walls includes a means for adjustably attaching said respective skid.

10. The invention as in claim 1 wherein the normal track of said wheel overlaps the forward profile of said respective skid.

11. The invention as in claim 1 wherein the normal track of said wheel is closely adjacent the forward profile of said respective skid.

12. The invention as in claim 5 wherein the normal track of said wheel overlaps the forward profile of said respective skid.

13. The invention as in claim 5 wherein the normal track of said wheel is closely adjacent the forward profile of said respective skid.

14. The invention as defined in claim 1 wherein said wheels are formed of and in alignment with said skid elements.

* * * * *

UNITED STATES PATENT AND TRADEMARK OFFICE
CERTIFICATE OF CORRECTION

PATENT NO. : 4,912,915

DATED : April 3, 1990

INVENTOR(S) : Edward H. Smit

It is certified that error appears in the above-identified patent and that said Letters Patent is hereby corrected as shown below:

Column 6, line 17, "formed" should be --forward--

Signed and Sealed this

Twenty-eighth Day of May, 1991

Attest:

HARRY F. MANBECK, JR.

Attesting Officer

Commissioner of Patents and Trademarks